United States Patent [19]
Nerone

[11] Patent Number: 5,874,810
[45] Date of Patent: Feb. 23, 1999

[54] ELECTRODELESS LAMP ARRANGEMENT WHEREIN THE EXCITATION COIL ALSO FORMS THE PRIMARY OF THE FEEDBACK TRANSFORMER USED TO SWITCH THE TRANSISTORS OF THE ARRANGEMENT

[75] Inventor: Louis R. Nerone, Brecksville, Ohio

[73] Assignee: General Electric Company, Schenectady, N.Y.

[21] Appl. No.: 922,204

[22] Filed: Sep. 2, 1997

[51] Int. Cl.$^6$ ................................................ H05B 41/16
[52] U.S. Cl. ................................... 315/248; 315/DIG. 7; 315/219
[58] Field of Search .............................. 315/248, DIG. 7, 315/111.51, 219, 209 R, 244, 224, 39

[56] References Cited

U.S. PATENT DOCUMENTS

| | | | |
|---|---|---|---|
| 4,415,838 | 11/1983 | Houkes | 315/248 |
| 4,463,286 | 7/1984 | Justice | 315/219 |
| 4,546,290 | 10/1985 | Kerekes | 315/209 R |
| 4,588,925 | 5/1986 | Fahnrich et al. | 315/101 |
| 4,647,817 | 3/1987 | Fahnrich et al. | 315/104 |
| 4,667,345 | 5/1987 | Nilssen | 315/209 R |
| 4,692,667 | 9/1987 | Nilssen | 315/209 R |
| 4,748,383 | 5/1988 | Houkes | 315/248 |
| 4,937,470 | 6/1990 | Zeller | 307/270 |
| 4,945,278 | 7/1990 | Chern | 315/209 R |
| 5,223,767 | 6/1993 | Kulka | 315/209 R |
| 5,309,062 | 5/1994 | Perkins et al. | 315/53 |
| 5,341,068 | 8/1994 | Nerone | 315/219 |
| 5,349,270 | 9/1994 | Roll et al. | 315/209 R |
| 5,355,055 | 10/1994 | Tary | 315/DIG. 7 |
| 5,387,847 | 2/1995 | Wood | 315/209 R |
| 5,406,177 | 4/1995 | Nerone | 315/307 |
| 5,424,616 | 6/1995 | Reijnaerts | 315/248 |
| 5,446,350 | 8/1995 | El-Hamamsy et al. | 315/248 |
| 5,514,981 | 5/1996 | Tam et al. | 326/80 |

*Primary Examiner*—Robert J. Pascal
*Assistant Examiner*—Michael Shingleton
*Attorney, Agent, or Firm*—Charles E. Bruzga

[57] ABSTRACT

A ballast for an electrodeless gas discharge lamp comprises a load circuit including an r.f. inductor for generating an r.f. field for powering the electrodeless lamp and a serially connected resonant capacitance. The inductance of the r.f. inductor has a substantial effect in determining a frequency of resonance the load circuit. A d.c.-to-a.c. converter circuit is coupled to the load circuit for inducing a.c. current therein. It comprises first and second converter switches serially connected in the foregoing order between a bus node at a d.c. voltage and a reference node, and being connected together at a common node through which the a.c. load current flows. The first and second converter switches each has a control node and a reference node, the voltage between such nodes determining the conduction state of the associated switch. The respective control nodes of the first and second converter switches are interconnected. The respective reference nodes of the first and second converter switches are interconnected at the common node. A control circuit provides a control signal on the interconnected control nodes, and comprises a driving inductor coupled between the common node and the interconnected control nodes. The driving inductor is mutually coupled to the r.f. inductor for sensing voltage across the r.f. inductor.

14 Claims, 1 Drawing Sheet

5,874,810

ELECTRODELESS LAMP ARRANGEMENT WHEREIN THE EXCITATION COIL ALSO FORMS THE PRIMARY OF THE FEEDBACK TRANSFORMER USED TO SWITCH THE TRANSISTORS OF THE ARRANGEMENT

FIELD OF THE INVENTION

The invention relates to an electrodeless lamp ballast employing serially coupled d.c.-to-a.c. converter switches, and, more particularly, to such a ballast having a reduced parts count.

BACKGROUND OF THE INVENTION

Co-pending, commonly owned application Ser. No. 08-897,435, filed Jul. 21, 1997, entitled "Ballast Circuit for Gas Discharge Lamp," by Louis R. Nerone (the present inventor), David J. Kachmarik, and Michael M. Secen, discloses and claims a ballast for an electrodeless lamp. The ballast includes a d.c.-to-a.c. converter formed of a pair of serially connected switches having opposite conduction modes. For instance, one switch may be an n-channel enhancement mode MOSFET, and the other, a p-channel enhancement mode MOSFET, with their sources interconnected at a common node. This allows a single control voltage applied to the gates, or control nodes, of the MOSFETs, to alternately switch on one MOSFET and then the other.

The foregoing ballast includes, in a resonant load circuit, both an r.f. inductor for generating high frequency fields for energizing the electrodeless lamp, and an inductor selected to set a resonant frequency of operation of the load.

It would be desirable to provide a ballast for an electrodeless lamp which, on the one hand, benefits from the simplicity of switch control obtained by using switches of different, or complementary, conduction types, while, on the other hand, reducing the parts count of the ballast, to reduce ballast cost.

SUMMARY OF THE INVENTION

An exemplary embodiment of the invention provides a ballast for an electrodeless gas discharge lamp. The ballast comprises a load circuit including an r.f. inductor for generating an r.f. field for powering the electrodeless lamp and a serially connected resonant capacitance. The inductance of the r.f. inductor has a substantial effect in determining a frequency of resonance the load circuit. A d.c.-to-a.c. converter circuit is coupled to the load circuit for inducing a.c. current therein. It comprises first and second converter switches serially connected in the foregoing order between a bus node at a d.c. voltage and a reference node, and being connected together at a common node through which the a.c. load current flows. The first and second converter switches each has a control node and a reference node, the voltage between such nodes determining the conduction state of the associated switch. The respective control nodes of the first and second converter switches are interconnected. The respective reference nodes of the first and second converter switches are interconnected at the common node. A control circuit provides a control signal on the interconnected control nodes, and comprises a driving inductor coupled between the common node and the interconnected control nodes. The driving inductor is mutually coupled to the r.f. inductor for sensing voltage across the r.f. inductor.

DETAILED DESCRIPTION OF THE INVENTION

Figure 1:
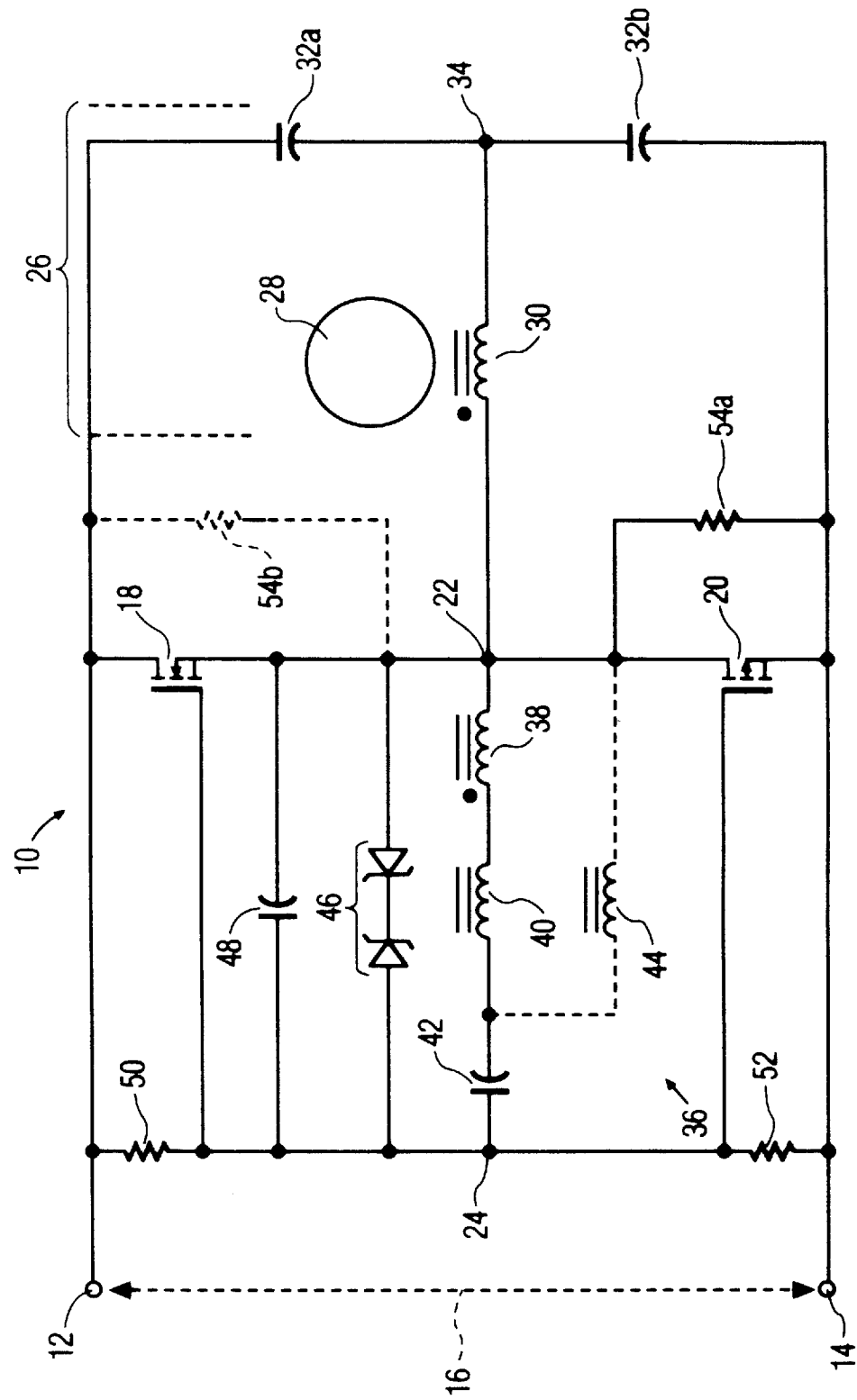
FIG. 1 is a schematic diagram of a ballast for an electrodless lamp achieving a reduction in parts count compared with the above-mentioned ballast.

FIG. 1 shows a ballast 10 employing features of the invention. Ballast 10 includes a bus node 12 and reference node 14, between which a d.c. bus voltage 16 exists. A d.c.-to-a.c. converter is realized through the employment of an upper switch 18 and a lower switch 20 serially interconnected at a common node 22. For instance, switch 18 may be an n-channel enhancement mode MOSFET, and switch 20, a p-channel enhancement mode MOSFET, with their sources interconnected at node 22. The gates, or control nodes, of MOSFETs 18 and 20 are interconnected at a control node 24.

A load circuit 26 includes an electrodeless lamp 28, which is powered by radio frequency (r.f.) energy supplied by an r.f. inductor 30. Inductor 30 may typically contain on the order of only 12 turns of winding. However, its inductance is preferably used as substantially the entire series resonant inductance in the load for setting a frequency of resonance of the load. Inductor 30 cooperates with a serially connected resonant capacitance comprising the parallel combination of capacitors 32a and 32b. These capacitors additionally cooperate to hold their common node 34, and hence, the right-shown node of inductor 30, at a potential between the potential of bus node 12 and of reference node 14. The purpose is to reduce radiated electromagnetic interference from r.f. inductor 30. Capacitors 32a and 32b also act as d.c. blocking capacitors.

A control circuit 36 for controlling operation of switches 18 and 20 includes a driving inductor 38 mutually coupled to r.f. inductor 30, e.g., a tap from inductor 30, with polarity as indicated by the dots in FIG. 1. Voltage proportional to current in the load circuit is induced in inductor 38, which, in turn, provides driving power for control circuit 36. Preferably coupled to inductor 38 is an inductor 40. A capacitor 42 is preferably included for initially charging up to a level at which one of switches 18 or 20 turns on.

A further inductor 44 is optionally coupled in parallel to driving inductor 38; for instance, inductor 44 may by shunted across the serial combination of inductors 38 and 40 as shown. The inclusion of inductor 44 allows accommodation of a somewhat narrow range of turns ratios as between inductors 30 and 38, owing to the relatively few numbers of turn of r.f. inductor 30 (e.g., 12). This beneficially increases flexibility in designing control circuit 36.

Control circuit 36 preferably includes a pair of back-to-back Zener diodes 46 to achieve bi-polar voltage level control between nodes 22 and 24. A capacitor 48 is also preferably included between nodes 22 and 24, to increase the dead-time intervals when both switches are off. Capacitor 48 is essentially in parallel with capacitor 42 while the latter initially charges up to a level at which one of the switches turns on. For providing power for starting regenerative operation of control circuit 36, a resistor 50 is connected between bus node 12 and control node 24, and a further resistor 52 is connected between reference node 14 and control node 24. A cooperating resistor 54a is connected between common node 22 and reference node 14. The resulting resistor network 50, 52 and 54a provides a charging path for capacitor 42 from bus voltage 16. When the voltage between nodes 24 and 22, or gate-to-source voltage of MOSFET switches 18 and 20, reaches the threshold voltage for the upper switch 18 to turn on, current begins to flow in the load circuit. Such load current is fed back to driving inductor 38 by r.f. inductor 30, so that regenerative operation of control circuit 36 occurs.

One possible modification of the foregoing resistor network is to delete resistor 52, and keep resistor 54a. Another modification is to, alternatively, delete resistor 50 and use resistor 54b, shown in dashed lines, rather than resistor 54a, shown in solid lines. In such case, capacitor 42 charges up to the opposite polarity, causing the lower switch 20 to turn on.

Exemplary component values for the circuit of FIG. 1 are as follows for a lamp 28 rated at 13 watts, with a d.c. bus voltage of 160 volts:

R.f. inductor 30 10 micro henries
Driving inductor 38 60 nano henries
Turns ratio between inductors 30 and 38 13
Inductor 40 1.2 micro henries
Inductor 44 6.8 micro henries
Capacitor 42 2.2 nano farads
Capacitor 48 470 pico farads
Zener diodes 48, each 7.5 volts
Resistors 50, 52, 54a, and 54b, each 0.1 megohm
Resonant capacitor 32a 330 picofarads
Resonant capacitor 32b 330 picofarads Additionally, switch $Q_1$ may be an IRFR210, n-channel, enhancement mode MOSFET, sold by International Rectifier Company, of El Segundo, Calif.; and switch $Q_2$, an IRFR9210, p-channel, enhancement mode MOSFET also sold by International Rectifier Company.

While the invention has been described with respect to specific embodiments by way of illustration, many modifications and changes will occur to those skilled in the art. It is therefore, to be understood that the appended claims are intended to cover all such modifications and changes as fall within the true spirit and scope of the invention.

What is claimed is:

1. A ballast for an electrodeless gas discharge lamp, comprising:
   (a) a load circuit including:
      (i) an r.f. inductor for generating an r.f. field for powering the electrodeless lamp; and
      (ii) a serially connected resonant capacitance;
      (iii) the inductance of said r.f. inductor having a substantial effect in determining a frequency of resonance said load circuit;
   (b) a d.c.-to-a.c. converter circuit coupled to said load circuit for inducing a.c. current therein, said converter circuit comprising:
      (i) first and second converter switches serially connected in the foregoing order between a bus node at a d.c. voltage and a reference node, and being connected together at a common node through which said a.c. load current flows;
      (ii) said first and second converter switches each having a control node and a reference node, the voltage between such nodes determining the conduction state of the associated switch;
      (iii) the respective control nodes of said first and second converter switches being interconnected; and
      (iv) the respective reference nodes of said first and second converter switches being interconnected at said common node; and
   (c) a control circuit for providing a control signal on said interconnected control nodes, comprising a driving inductor coupled between said common node and said interconnected control nodes; said driving inductor being mutually coupled to said r.f. inductor for sensing voltage across said r.f. inductor.
2. The ballast of claim 1, wherein:
   (a) each of said r.f. and driving inductors includes respective winding turns; and
   (b) a second inductor is coupled in parallel with said driving inductor for increasing design tolerance of turns ratio as between winding turns of said r.f. inductor and winding turns of said driving inductor.
3. The ballast of claim 2, wherein:
   (a) a third inductor is serially connected to said driving inductor, between said common and control nodes; and
   (b) said second inductor is shunted across the serial combination of said third and driving inductors.
4. The ballast of claim 1, further including back-to-back Zener diodes connected between said common and said interconnected control nodes.
5. The ballast of claim 1, wherein said resonant capacitance comprises a pair of serially connected capacitors coupled between said bus node and said reference node, and whose common node is coupled to said r.f. inductor.
6. The ballast of claim 1, further including a resistor network for starting said first switch comprising a first resistor substantially shunted across said first switch and a second resistor connected between said reference node and said interconnected control nodes.
7. The ballast of claim 1, further including a resistor network for starting said second switch comprising a first resistor substantially shunted across said second switch and a second resistor connected between said bus node and said interconnected control nodes.
8. A ballast for an electrodeless gas discharge lamp, comprising:
   (a) a load circuit including:
      (i) an r.f. inductor for generating an r.f. field for powering the electrodeless lamp; and
      (ii) a serially connected resonant capacitance;
      (iii) the inductance of said r.f. inductor constituting substantially the entire resonant inductance serially connected to said capacitance for setting a frequency of resonance of said load;
   (b) a d.c.-to-a.c. converter circuit coupled to said load circuit for inducing a.c. current therein, said converter circuit comprising:
      (i) first and second converter switches serially connected in the foregoing order between a bus node at a d.c. voltage and a reference node, and being connected together at a common node through which said a.c. load current flows;
      (ii) said first and second converter switches each having a control node and a reference node, the voltage between such nodes determining the conduction state of the associated switch;
      (iii) the respective control nodes of said first and second converter switches being interconnected; and
      (iv) the respective reference nodes of said first and second converter switches being interconnected at said common node; and
   (c) a control circuit for providing a control signal on said interconnected control nodes, comprising a driving inductor coupled between said common node and said interconnected control nodes; said driving inductor being mutually coupled to said r.f. inductor for sensing voltage across said r.f. inductor.
9. The ballast of claim 7, wherein:
   (a) each of said r.f. and driving inductors includes respective winding turns; and
   (b) a second inductor is coupled in parallel with said driving inductor for increasing design tolerance of turns ratio as between winding turns of said r.f. inductor and winding turns of said driving inductor.

10. The ballast of claim 8, wherein:
(a) a third inductor is serially connected to said driving inductor, between said common and control nodes; and
(b) said second inductor is shunted across the serial combination of said third and driving inductors.

11. The ballast of claim 7, wherein said resonant capacitance comprises a pair of serially connected capacitors coupled between said bus node and said reference node, and whose common node is coupled to said r.f. inductor.

12. The ballast of claim 7, further including back-to-back Zener diodes connected between said common and said interconnected control nodes.

13. The ballast of claim 7, further including a resistor network for starting said first switch comprising a first resistor substantially shunted across said first switch and a second resistor connected between said reference node and said interconnected control nodes.

14. The ballast of claim 7, further including a resistor network for starting said second switch comprising a first resistor substantially shunted across said second switch and a second resistor connected between said bus node and said interconnected control nodes.

* * * * *